United States Patent [19]

Ozil et al.

[11] Patent Number: 4,507,697

[45] Date of Patent: Mar. 26, 1985

[54] DEVICE FOR INDICATING THE POSITION OF PRINTED CIRCUIT CARDS RELATIVE TO THEIR CONNECTORS

[76] Inventors: Maurice Ozil, 73, rue des Morillons, 75015 Paris; Ulrich Finger, 30, rue du Moulin de Pierre, 92140 Clamart, both of France

[21] Appl. No.: 474,303

[22] Filed: Mar. 11, 1983

[30] Foreign Application Priority Data

Mar. 17, 1982 [FR] France .................. 82 04528

[51] Int. Cl.³ ............................................. H02H 7/22
[52] U.S. Cl. ......................................... 361/1; 361/2; 361/110; 340/687; 339/113 B; 339/198 P; 200/51.09
[58] Field of Search ............ 361/1, 58, 2, 3, 10, 361/110; 340/686, 687, 568, 593, 815.28, 524, 523; 339/113 R, 113 B, 113 L, 198 P; 200/51 R, 51.06, 51.09

[56] References Cited

U.S. PATENT DOCUMENTS

| | | | |
|---|---|---|---|
| 3,414,806 | 12/1968 | Carr . | |
| 3,431,431 | 3/1969 | Martin | 361/2 |
| 3,611,261 | 10/1971 | Gregory | 340/687 X |
| 4,037,186 | 7/1977 | Palmer | 200/51.09 X |
| 4,245,270 | 1/1981 | Busby | 361/58 |
| 4,330,825 | 5/1982 | Girard | 340/687 X |
| 4,377,315 | 3/1983 | Grau | 339/113 R X |
| 4,379,606 | 4/1983 | Clark et al. | 339/113 R X |

FOREIGN PATENT DOCUMENTS 1277904 10/1961 France .
1173525 10/1969 United Kingdom .

*Primary Examiner*—Patrick R. Salce
*Attorney, Agent, or Firm*—Oblon, Fisher, Spivak, McClelland & Maier

[57] ABSTRACT

Device for indicating the positions of printed circuit cards with respect to their connectors, said cards belonging to an operational system in which each of them carries logic components and has a terminal surface carrying conductor elements able to come into contact with the corresponding conductor elements of an electrical connector, the corresponding conductors of the connector and of the card being able to occupy three relative positions: a first or safe contact position between the corresponding conductor elements of the connector and of the card, the card being correctly positioned relative to its connector, a second intermediate or non-safe contact position between the corresponding conductor elements of the connector and of the card, when the latter is being inserted or removed with respect to its connector, and a third or contact break position between the corresponding conductor elements of the connector and the card, when the card is completely withdrawn from its connector, wherein the device has means sensitive to the positions of the cards in order to supply a position indication logic signal having a first logic state when the card occupy the first position or when at least one card occupies the third position, the signal having a second logic state when at least one card occupies the second intermediate position.

10 Claims, 5 Drawing Figures

DEVICE FOR INDICATING THE POSITION OF PRINTED CIRCUIT CARDS RELATIVE TO THEIR CONNECTORS

BACKGROUND OF THE INVENTION

The present invention relates to a device for indicating, defining or fixing the positions of printed circuit cards or boards, with respect to their connectors. It more particularly applies to any functional system of printed circuit cards carrying electrical or logic components, in which the different positions which can be occupied by these cards relative to their connectors must be indicated during the operation of the system. This serves to reduce the period during which the system is stopped during the removal or reinsertion of a card with respect to its connector.

It is known that a printed circuit card or board carrying electrical and/or logic components has a terminal surface carrying conductor elements able to enter into electrical contact. The outputs of the electrical connectors make it possible to interconnect the various cards or connect these cards with the cards of another system. The corresponding conductors of the connector and card can occupy three relative positions, a first position called the "safe" contact position between the corresponding conductor elements of the connector and the card, this being the position for which the card is correctly installed relative to its connector and for which it makes it possible to affirm that the operation of the system of cards is correct. One or more of these cards can also occupy a so-called intermediate second position, for which the contacts between the corresponding conductor elements of the connector and the card are "not safe". Thus, when a card is being inserted or removed with respect to its connector, it is not possible to affirm that the operation of the system takes place under satisfactory conditions, because the contact between the conductor elements of the card and of the connector cannot be looked upon as correctly ensured. Finally, there is a third position for one or more cards relative to their connectors. This is the position when one or more cards are completely removed from the connector corresponding thereto, no contact being any longer established between the corresponding conductor elements of the card and of the connector.

At present, there is no device making it possible to automatically indicate within a system of printed electrical circuit cards carrying electrical and/or logic components, the different positions of said cards relative to their connectors.

In any functional system requiring a permanent operation, the removal of a card leads to a relatively long immobilization thereof. To prevent this, this system is generally duplicated, so that it is not necessary to interrupt for an excessively long time one of the systems, in the case of removing one or more cards from the other system. This is generally the case in printed circuit card systems carrying memories and microprocessors. In such systems, when it is necessary to remove a card for a random intervention, various operations have to carried out by the technician in a non-automatic manner. He must firstly supply instructions for protecting data contained in the memories, then must place all the processors or microprocessors in the hold position and then, if necessary, must interrupt the electrical power supplies of the cards in the system for which an intervention is necessary. Finally, it is necessary for the technician to initialize the operation of the duplicated system. These non-automatic interventions take a long time.

SUMMARY OF THE INVENTION

The object of the present invention is to obviate these disadvantages and in particular to provide a device for indicating the positions of printed circuit cards relative to their connectors. This device makes it possible to automatically indicate the three positions which each card can occupy relative to its connector. It also makes it unnecessary for the technician to carry out all the necessary operations during the removal or reinsertion of a card into its connector. This device has the important advantage of preventing a long interruption in the operation of a system of printed circuit cards during the manipulation of one or more cards and also obviates the costly duplication of systems of permanently functioning cards.

The present invention specifically relates to a device for indicating the positions of printed circuit cards with respect to their connectors, said cards belonging to an operational system in which each of them carries logic components and has a terminal surface carrying conductor elements able to come into contact with the corresponding conductor elements of an electrical connector, the corresponding conductors of the connector and of the card being able to occupy three relative positions: a first or safe contact position between the corresponding conductor elements of the connector and of the card, the card being correctly positioned relative to its connector, a second intermediate or non-safe contact position between the corresponding conductor elements of the connector and of the card, when the latter is being inserted or removed with respect to its connector, and a third or contact break position between the corresponding conductor elements of the connector and the card, when the card is completely withdrawn from its connector, wherein the device has means sensitive to the positions of the cards in order to supply a position indication logic signal having a first logic state when the cards occupy the first position or when at least one card occupies the third position, the signal having a second logic state when at least one card occupies the second intermediate position.

According to another feature of the invention, the means sensitive to the positions of the cards comprise at least one switch having a contact with a fixed position relative to the system and a moving contact, whose displacements relative to the fixed contact correspond to the closing or opening of the switch, the moving contact being mechanically connected to each of the cards, in such a way that the opening corresponds to the first and third positions and the closing corresponds to the second position or vice versa, the contacts being connected to the means in order to supply the logic signal at an output.

According to another feature, the output of the means supplying the logic signal is connected to switching means.

According to another feature of the invention, the means sensitive to the positions of the cards comprise a light source and an electrooptical detector of the positions of the cards, the cards carrying marks corresponding to the first, second and third positions and the detector supplying at an output the said logic signal corresponding to the first, second and third positions.

According to another feature, the detector output is connected to switching means.

According to another feature of the invention, the switching means comprise at least one monostable flip-flop triggered by the logic signal and having a conduction time exceeding the logic signal maintenance time between the first and third positions in order to carry out, for the logic components carried by the cards, protection, operation stoppage or reinitialization operations.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
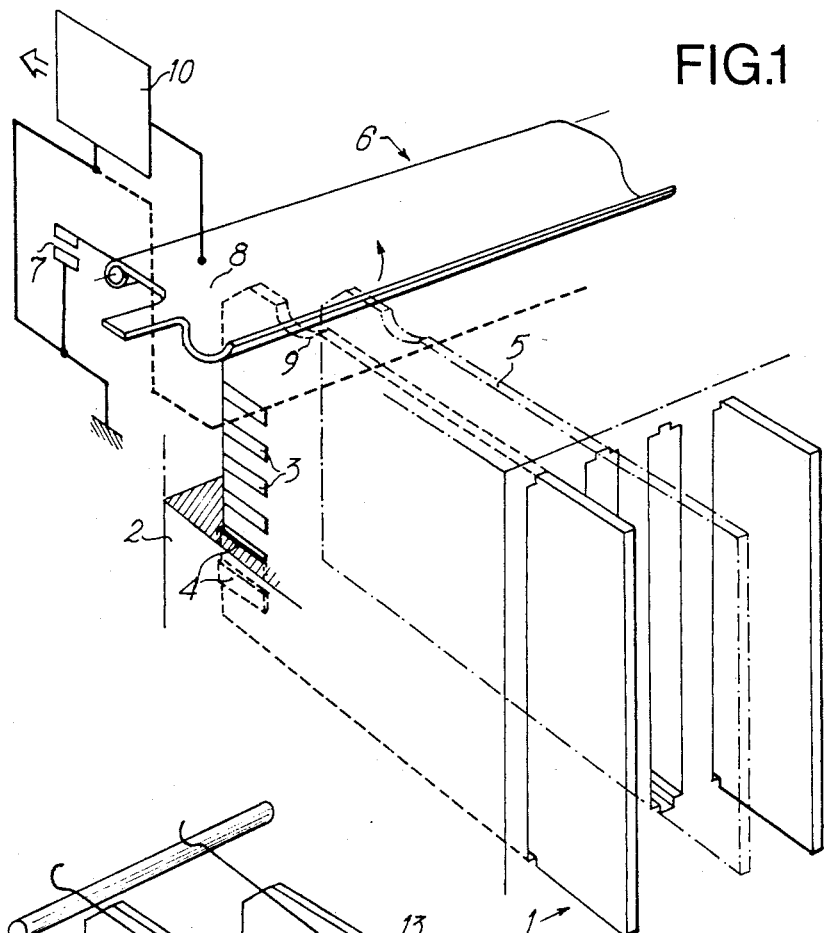
FIGS. 1, 2 and 3 diagrammatically, various embodiments of the device according to the invention.
Figure 2:
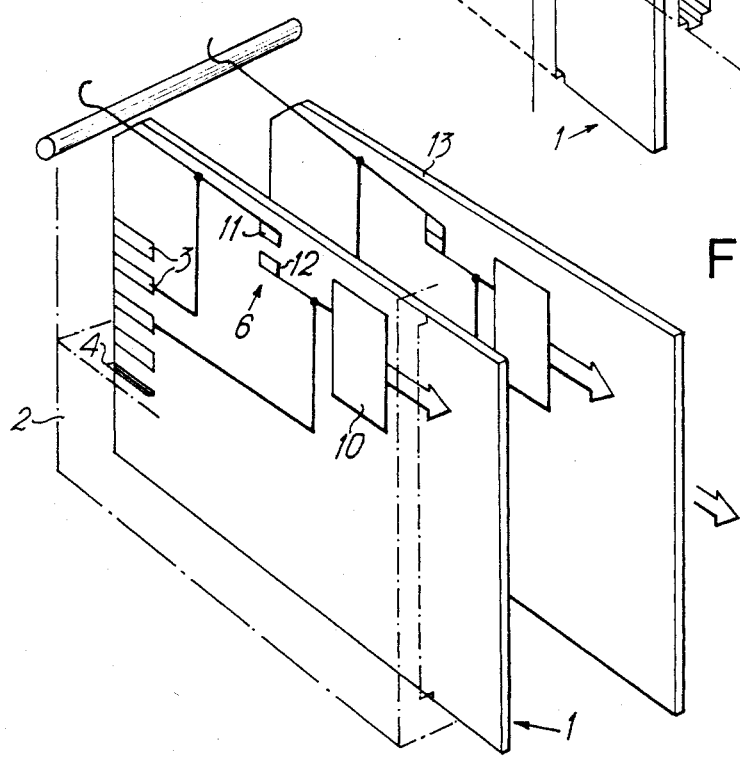

FIGS. 1 and 2 very diagrammatically show various embodiments of the indicating device according to the invention. The same elements carry the same references in these drawings.

FIG. 1 shows a first embodiment of the device for indicating the positions of printed circuit cards 1, relative to their connectors 2 in a functional assembly. Each of these cards has on a terminal surface, conductor elements 3 able to come into contact with the corresponding conductor elements 4 of an electrical connector. The connections existing between the different connectors of the system are not shown in FIG. 1. Card 1 is completely engaged in connector 2, in such a way that it is possible to affirm that in this first position, the contact between the corresponding conductor elements of the connector and the card are safe contacts. Card 5 occupies a second or intermediate position relative to its connector. This card is being removed or inserted and in this second or intermediate position, the contacts between the corresponding conductor elements of the connector and the card are not safe. Finally, a card can be completely removed from its connector. This third position can be called the contact break position between the corresponding conductor elements of the connector and the card. The device comprises means sensitive to the positions of the cards able to supply a position indication logic signal, the logic states of this signal being dependent on the relative positions of the cards and the connectors. These sensitive means comprise here a switch 6 having a contact 7 with a fixed position relative to the system of cards, and a moving contact 8, whose displacements relative to the fixed contact, lead to the closing or opening of the switch. Moving contact 8 bears on each of the cards, in the manner shown in the drawing, so that when all the cards are correctly engaged in their connectors or one or more cards are completely removed (cards occupying the first and third positions referred to hereinbefore), the switch is open. The opening of the switch when the cards are correctly engaged in their connectors is due to the notch 9 made on each of the cards.

Conversely, when a card occupies the second intermediate position (e.g. card 5), the moving contact 8 moves downwards and the switch is closed. The means sensitive to the positions of the cards also comprise logic means 10 connected to the switch contacts to supply a logic signal corresponding to the open or closed state of the switch and consequently corresponding to the positions of the cards. These logic means will be described in greater detail hereinafter and are either incorporated into each of these cards (the current distribution taking place on all the cards in question by means of the dotted line connection), or are common to the system of cards (less reliable solution shown in the drawing).

FIG. 2 shows another embodiment of the device according to the invention. The means sensitive to the positions of the cards are in this case constituted by a system of switches 6 respectively corresponding to each of the cards. Each switch comprises a moving contact 11 and a fixed contact 12, said contacts being connected to logic means 10 in order to supply a logic signal, whose states depend respectively on the positions of each card relative to its connector (not shown in the drawing). Each of the switches 6 is in the open position when the corresponding card is correctly in place relative to its connector, or is completely removed therefrom (first or third positions). This switch is closed when the card is either in the withdrawn position, or in the inserted position (second intermediate position). The logic means 10, as in FIG. 1, supply a logic signal representing the closing or opening of the switch and thus representing the corresponding card position. This signal can be supplied to the actual card in order to carry out all the protection, stopping or initialization operations for certain logic components of this card. It can also be supplied to other cards in order to control operations of the same type. In FIG. 2, card 13 is in an intermediate position, whilst card 1 is in the first position. The moving contact of switch 6 can be connected to a reference earth via a conductor element 3. The logic elements 10 may optionally be positioned within the cards.

Figure 3:
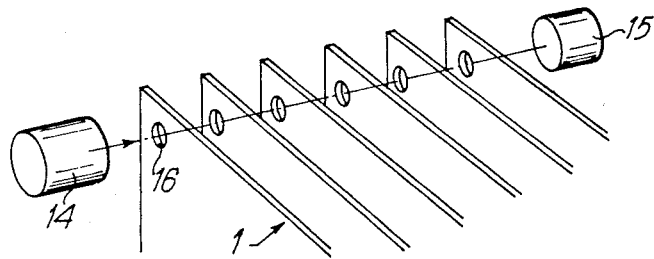

FIG. 3 shows another embodiment of the device according to the invention. According to this embodiment, the means sensitive to the positions of the cards comprise a light source 14, which emits a light beam in the direction of a light detector 15 through opening 16 made in each of the cards, in the vicinity of the not shown connectors. When the cards are correctly positioned in their connectors, or when one or more of them are completely removed, (first or third positions), detector 15 supplies a signal having a first logic state corresponding e.g. to the opening of the switch of the preceding drawings. Conversely, when one of the cards is being withdrawn or inserted with respect to its connector (second intermediate position), the light beam between source 14 and detector 15 is interrupted. This detector then supplies a signal, whose logic state corresponds e.g. to the closed position of the switch of FIG. 4. This detector, which is well known in the art, can include signal shaping means, but will not be described in greater detail here.

Figure 4:
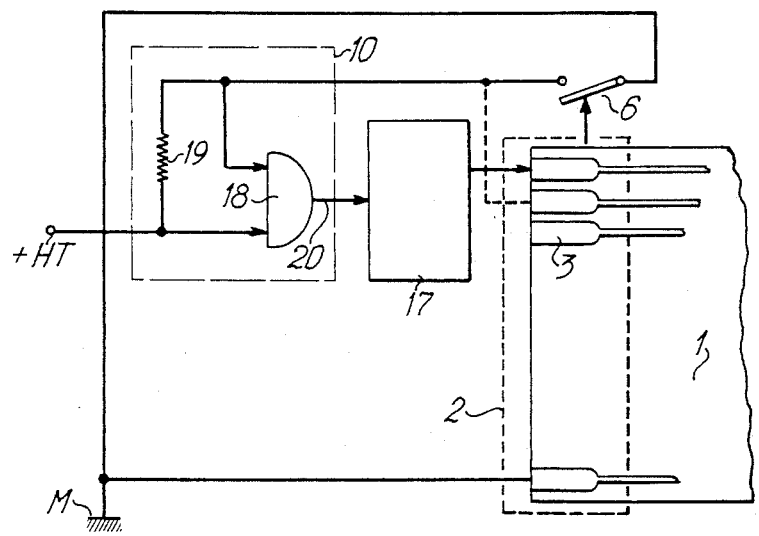
FIG. 4 in greater detail the means of the device which supply a position indication signal.

FIG. 4 shows in greater detail the means making it possible, for the embodiments of FIGS. 1 and 2, to supply a logic signal dependent on the positions of the cards and consequently the open or closed positions of switch 6. For ease of representation, FIG. 1 only shows a single card, but it is obvious that what is described also applies to a functional system of printed circuit cards carrying electrical and/or logic components. These cards have an end surface carrying conductor elements 3 connected to printed circuits on the card and able to enter in contact with corresponding conductor elements (not shown) of a connector 2. The device shown in FIG. 4 comprises, apart from the means sensitive to the positions of the cards constituted by switch 6 and logic means 10, switching means 17, which will be described in greater detail hereinafter. As for FIGS. 1 and 2, logic means 10 are either external of the cards, or are carried by each of the cards.

For the two embodiments shown in FIGS. 1 and 2, the logic means 10 comprise an e.g. AND-type gate 18. One of the inputs of this gate is connected to a terminal of a resistor 19, as well as to a high voltage source +HT. For example, this source can be an electrical power supply for the circuit and components located on card 1. The other input of gate 18 is connected to another terminal of resistor 19, as well as to a terminal of switch 6. The other terminal of this switch is connected to a reference earth M, which can also be the reference earth of the circuits and components of card 1. In the embodiment of FIG. 1, there is only a single switch 6 for the system of cards. It is only possible to indicate the removal or insertion of a single card into the system. A single gate 7 and a single resistor 8 are necessary and the two-state signal appears on the output 20 of gate 18. In the case where there is a switch for each card, an AND gate and a resistor are associated with each switch. The device according to the invention also comprises switching means 17 connected to output 20 of gate 18. These switching means receive the logic signal from gate 18 and supplies, in the manner to be shown hereinafter, a switching signal which, during the removal or reinsertion of a card, makes it possible to transmit to this card, as well as to the system of other cards, signals intervening in their operation. These switching means 17 can be constituted by a monostable circuit or by a triggerable monostable flip-flop. In the embodiment of FIG. 1, there can be a flip-flop supplying its output signal to the system of cards, but it is also possible to use one flip-flop per card. In the embodiment of FIG. 2, there is a monostable flip-flop for each corresponding AND gate. Each monostable flip-flop can either be external of the corresponding card, or can be carried by this card, said position being dependent on the choice made for the position of the logic means 10. The gates and flip-flops can optionally be carried by the actual cards. In the embodiment of FIG. 3, the flip-flop receives the logic signal from detector 15 and in this case there is no need to use an AND gate 18 and a resistor 19.

Figure 5:
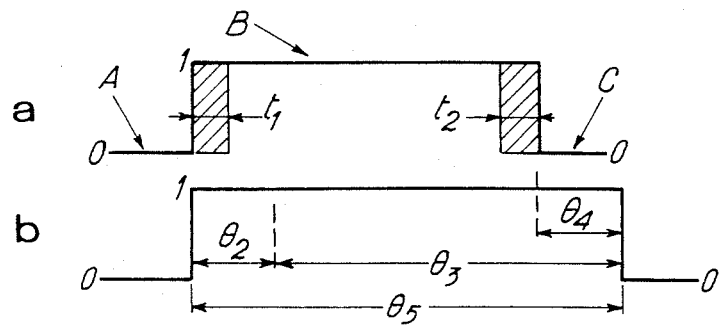
FIG. 5 at a the position indication logic signal obtained at the output of one of the means of the device and at b a switching signal making it possible to start certain operations in the cards provided with the indicating device.

FIG. 5 shows at a, the diagram of the logic signal obtained at the output of gate 18 of the means sensitive to the positions of the cards, and at b the signal supplied by flip-flop 17 of the switching means. The signal shown in diagram a has two logic states 0 and 1, state 0 corresponding to the opening of switch 6 and state 1 to the closing of said switch. These logic states are also those obtained at the output of detector 15 of FIG. 3 during the removal or reinsertion of the card.

In the case of the removal of a card, the switch is initially open (first position of the card), which corresponds to portion A of the diagram (logic state 0). Removal of a card is then commenced (second position of the card) and the switch closes, which corresponds to portion B of the diagram (logic state 1). Finally, when the card is removed from its connector (third position of the card), the switch opens and this corresponds to position C of the diagram (logic state 0).

In the case of the insertion of a card, initially switch 6 is open (third position of the card) and this corresponds to portion A of the diagram. The switch is then closed, as soon as the card starts to be inserted into the connector (second position of the card), which corresponds to portion B of the diagram. Finally, when the card is correctly positioned (first position), the switch opens and this corresponds to portion C of the diagram. The passage of the switch from the closed to the open position and vice versa is accompanied by a certain number of unwanted signals during delays shown at $t_1$ and $t_2$ in diagram a of FIG. 3. It can be considered that switch 6 is open for the second position of the cards and closed for the first and third positions thereof.

Diagram b shows the signal supplied by the retriggerable monostable flip-flop 17, whose conduction time exceeds the hold time of logic state 1 of the output signal of gate 18.

In the case of the removal of a card, when the output of AND gate 18 passes from state 0 to state 1, the output of monostable flip-flop 17 also passes from 0 to 1 (the card passing from the first to the second position). If the cards carry memories and microprocessors, during a time interval $\theta_2$ exceeding time $t_1$, operations for protecting the content of the memories and for placing in a hold state all the processors of the cards are performed. This hold state is maintained during time $\theta_3$ up to the stopping of the conduction of the flip-flop. It is also possible to stop the power supply to the cards or card being removed (case of FIG. 2). It is then assumed that when the card is completely removed (third position and passage from logic state 1 to logic state 0 of the output signal of gate 18), the monostable flip-flop 17 still conducts for a time $\theta_4$. Its output signal then passes from 1 to 0. When the output signal of the monostable flip-flop has dropped again to 0, the power supplies for the cards are started up again if they had been stopped, and the processors and contents of the memories of the other cards in the system are reinitialized. Thus, the output signal of the monostable flip-flop is transmitted to all the cards by a bus common to all the connectors, in the case where there is a single switch for all the cards, the flip-flop being itself common to all the cards or is integrated into each of the considered cards (limitation of risks of malfunctioning). In the case where there is a marking switch for each card, each card carries a monostable flip-flop and an AND gate 18. Each flip-flop then has a conduction time, which is dependent on the operation to be carried out on each card in the case of a displacement of one of the cards. The output signal of this flip-flop can optionally also be transmitted to the other cards by a common bus.

However, when a card which has been removed, is reintroduced into its connector, the logic signal at the output of gate 18 passes from logic state 0 to logic state 1, corresponding to the closing of switch 6 (card passing from the third position into the second position). This logic state change triggers the monostable flip-flop 17, whose output also passes from logic state 0 to logic state 1. As stated hereinbefore, this flip-flop has a conduction time $\theta_5$, which exceeds the time during which the output signal of gate 18 is maintained at level 1. Thus, as stated hereinbefore, this conduction time exceeds the hold time by a time interval $\theta_4$, which is a safety factor making it possible to affirm that the contacts have again been established in a safe manner between the conductor elements of the connector and the conductor elements of the card (first position of the card). When the logic signal of the monostable flip-flop drops again to 0, it is possible by transmitting the output signal of the monostable flip-flop on the common bus, to reinitialize all the components of the system of cards necessitating such a reinitialization and to recommence all the processing operations performed by these cards. In general, only the reinserted cards require such a reinitialization, because the other cards have already been reinitialized after the removal of one of the cards.

What is claimed is:

1. A device for indicating the positions of printed circuit cards with respect to electrical connectors, said cards belonging to an operational system in which each of them carries logic components and has a surface of extremity carrying conductor elements able to come into contact with the corresponding conductor elements of an electrical connector, the corresponding conductors of the connector and of the card being able to occupy three relative positions: a first or safe contact position between the corresponding conductor elements of the connector and of the card, the card being correctly positioned relative to its connector, a second intermediate or non-safe contact position between the corresponding conductor elements of the connector and of the card, when the latter is being inserted or removed with respect to its connector, and a third or contact break position between the corresponding conductor elements of the connector and the card, when the card is completely withdrawn from its connector, wherein said device comprises means sensitive to the positions of the cards in order to supply a position indication logic signal having a first logic state when the cards occupy the first position or when at least one card occupies the third position, the signal having a second logic state when at least one card occupies the second intermediate position.

2. An indicating device according to claim 1, wherein the means sensitive to the positions of the cards comprise at least one switch having a contact with a fixed position relative to the system and a moving contact, whose displacements relative to the fixed contact correspond to the closing or opening of the switch, the moving contact being mechanically connected to each of the cards, in such a way that the opening corresponds to the first and third positions and the closing corresponds to the second position, the contacts being connected to means supplying said logic signal at an output.

3. An indicating device according to claim 2, wherein the output of the means supplying the logic signal is connected to switching means.

4. An indicating device according to claim 1, wherein the means sensitive to the positions of the cards comprise a light source the light beam from which is directed towards an electrooptical detector of the positions of the cards, the detector supplying at an output the said logic signal corresponding to the first, second and third positions.

5. An indicating device according to claim 4, wherein the detector output is connected to switching means.

6. An indicating device according to claim 3 or 5, wherein the switching means comprise at least one monostable flip-flop triggered by the logic signal and having a conduction time exceeding the logic signal maintenance time between the first and third positions in order to carry out, for the logic components carried by the cards, protection, operation stoppage or reinitialization operations.

7. An assembly of printed circuit cards, said assembly comprising a plurality of printed circuit cards each one of which carries logic components, electrical connectors for each of said plurality of printed circuit cards, and means for detecting insertion or removal of said printed circuit cards and for supplying a first signal when all of said plurality of printed circuit cards are in either a first or a third position and a second signal when at least one of said plurality of printed circuit cards is in a second position, said first position of each of said plurality of printed circuit cards being a safe contact position between that one of said plurality of printed circuit cards and the corresponding electrical connectors, said first position occurring when that one of said plurality of printed circuit cards is correctly positioned relative to the corresponding electrical connectors, said second position of each of said plurality of printed circuit cards being an intermediate or non-safe contact position between that one of said plurality of printed circuit cards and the corresponding electrical connectors, said second position occurring when that one of said plurality of printed circuit cards is being inserted or removed from the assembly, and said third position of each of said plurality of printed circuit cards being a non-contact position between that one of said plurality of printed circuit cards and the corresponding electrical connectors, said third position occurring when that one of said plurality of printed circuit cards is completely separated from the corresponding electrical connectors, said means for detecting insertion or removal of said printed circuit card and for supplying first and second signals comprising means for supplying said first logic signal when all of said plurality of printed circuit cards are in either said first position or said third position and for supplying said second logic signal when at least one of said plurality of printed circuit cards is in its second position.

8. An assembly as recited in claim 7 wherein said means for detecting insertion or removal of said printed circuit card comprises at least one switch comprising a first contact with a fixed position relative to said electrical connectors and a plurality of second, movable contacts which can make and break contact with said first switch, each of said movable contacts being mechanically connected to a corresponding one of said plurality of printed circuit cards in such a way that, when all of said movable contacts are not in contact with said first switch, said means supply said first signal and, when any one of said movable contacts is in contact with said first switch, said means supplies said second logic signal.

9. An assembly as recited in claim 7 wherein said means for detecting insertion or removal of said printed circuit card comprises means for projecting a beam of light and an electrooptical detector positioned to detect said beam of light when all of said plurality of printed circuit cards are in either their first or their third positions but not to detect said beam of light when any one of said plurality of printed circuit cards is in its second position.

10. An assembly as recited in either claim 8 or claim 9 wherein said means for supplying said first logic signal comprises at least one monostable flip-flop triggered by said first and second logic signals and having a conduction time exceeding the logic signal maintenance time between said first and third positions, whereby said logic components carried by each of said plurality of printed circuit cards can carry out protection, operation stoppage, or reinitialization operations when one of said plurality of printed circuit cards is moved from its first position to its third position or from its third position to its first position.

* * * * *